United States Patent [19]

Tawil et al.

[11] Patent Number: 4,825,077
[45] Date of Patent: Apr. 25, 1989

[54] PROCESS CONTROL SYSTEM AND METHOD

[75] Inventors: Riad A. Tawil, Kirtland; David H. Sicking, Cleveland Hts., both of Ohio

[73] Assignee: The Harshaw Chemical Company, Cleveland, Ohio

[21] Appl. No.: 121,099

[22] Filed: Nov. 16, 1987

Related U.S. Application Data

[63] Continuation of Ser. No. 818,814, Jan. 14, 1986, abandoned.

[51] Int. Cl.$^4$ ............................................. G01N 23/06
[52] U.S. Cl. ...................................... 250/369; 378/54; 250/359.1
[58] Field of Search ............... 250/369, 374, 269, 374, 250/358.1, 308, 359.1; 378/54, 55, 56, 50, 89

[56] References Cited

U.S. PATENT DOCUMENTS

| | | | |
|---|---|---|---|
| 3,668,401 | 6/1972 | Shah et al. | 378/54 |
| 3,832,550 | 8/1974 | Bartlett et al. | 378/56 |
| 3,959,653 | 5/1976 | Lee et al. | 250/374 |
| 4,075,701 | 2/1978 | Hofmann | 332/11 D |
| 4,160,165 | 7/1979 | McCombs et al. | 250/369 |
| 4,353,028 | 10/1982 | Faddegon | 250/369 |

FOREIGN PATENT DOCUMENTS

| | | | |
|---|---|---|---|
| 0046632 | 3/1982 | European Pat. Off. | 250/374 |
| 2437001 | 5/1980 | France | 250/374 |

*Primary Examiner*—Carolyn E. Fields
*Assistant Examiner*—Richard Hanig
*Attorney, Agent, or Firm*—Renner, Otto, Boisselle & Sklar

[57] ABSTRACT

A system and related method for sensing a parameter of a medium by means of radiation attenuation, the system including a radiation source for emitting radiation that will be attenuated as a function of the parameter upon passage through the medium and a radiation detector operatively positioned to detect the radiation that will be attenuated as aforesaid, and the system being further characterized by the detector comprising a scintillator probe for producing an electrical current output proportionally representative of detected radiation, a current integrator for continuously integrating the electrical current output of the scintillator probe, the current integrator having an input for receiving the electrical current output of the scintillator probe and an output for producing an electrical output representative of the integral of curernt received at the input thereof, a charge injector for supplying to the input of the current integrator current pulses of predetermined total charge and of opposite polarity relative to the electrical current output of the scintillator probe in response to the output of the current integrator having a predetermined characteristic, and a detector output for generating count signals at a frequency proportionally representative of the frequency at which the current pulses are supplied to the input of the current integrator by the charge injector.

10 Claims, 2 Drawing Sheets

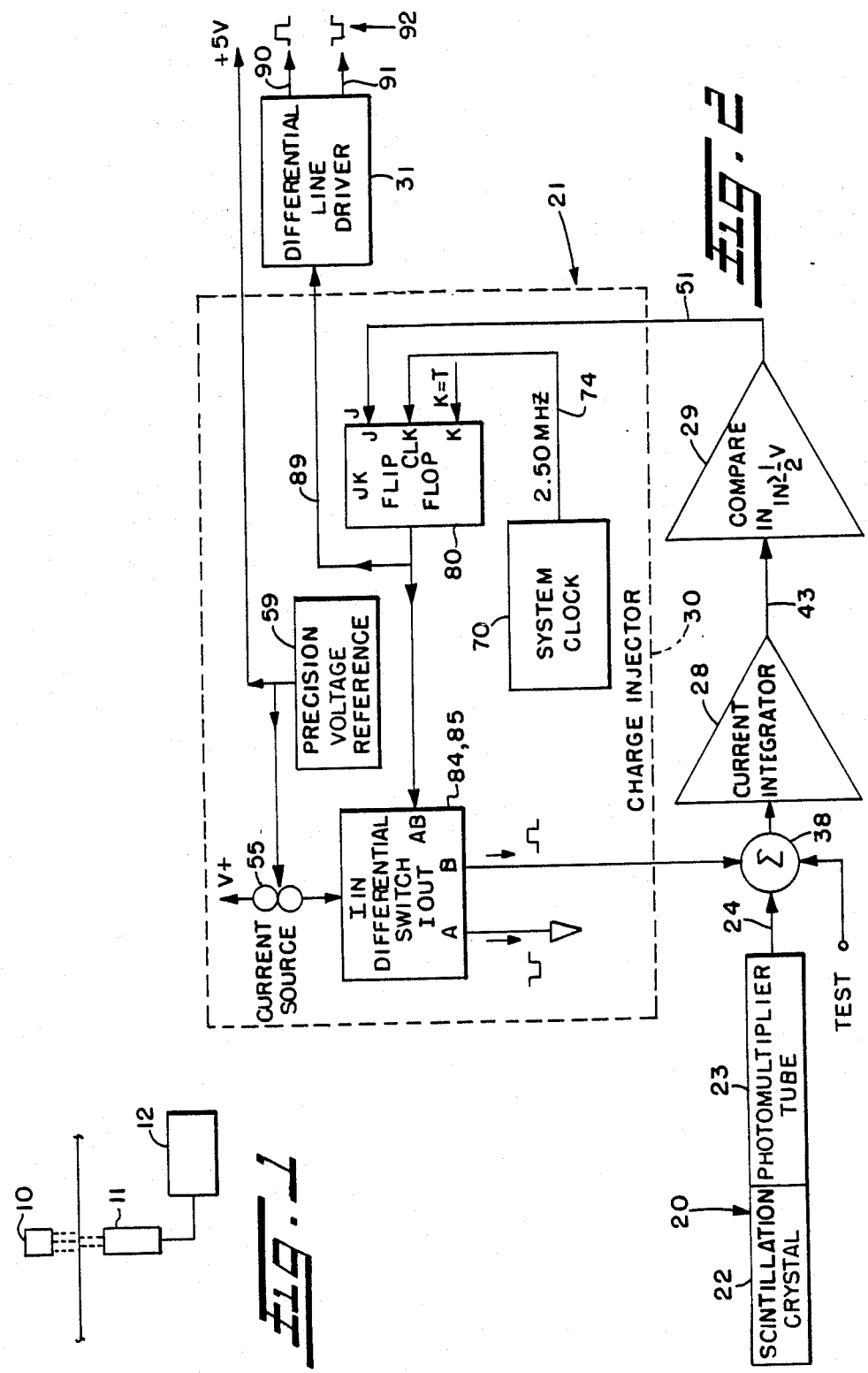

PROCESS CONTROL SYSTEM AND METHOD

This is a continuation of Ser. No. 818,814 filed on Jan. 14, 1986 now abandoned.

DISCLOSURE

The invention herein disclosed relates generally to systems, detectors and methods for sensing a parameter of a medium by means of radiation attenuation and, more particularly, to such a system, detector and method characterized by a high dynamic range.

BACKGROUND

Radiation attenuation techniques have been used to measure or sense a parameter of a medium such as thickness, density, presence of a part, etc. Such techniques generally involve the passage or placement of the medium between a source of radiation and a radiation detector located in the shadow of the medium. The radiation emitted by the source thereof will then have to pass through the medium in order to be detected by the detector. The radiation is selected to be of a type that will be attenuated as a function of the parameter to be measured or sensed whereby the amount of radiation reaching the detector will vary as a function of such parameter.

One common type of radiation detector or probe used for sheet metal gauging applications includes a scintillation crystal which is optically coupled to a photomultiplier tube. The scintillation crystal converts impinging invisible radiation to bursts of visible light which are converted by the photomultiplier tube to electrical charge pulses. The charge pulses outputted by the photomultiplier tube are processed by electronic circuitry, such as a nuclear instrumentation module, which provides, for example, pulse count data to an associated display or system controller.

In sheet gauging systems wherein the radiation is attenuated as a function of sheet thickness, the rate at which scintillations are produced in the detector by such radiation will also be a function of sheet thickness. If only the scintillations caused by the attenuated radiation result in pulse count signals, the rate of such pulse count signals likewise would be a function of sheet thickness—the higher the rate, the thinner the sheet.

The sensing speed of the gauging system or other parameter measuring systems employing radiation attenuation techniques is related to the flux level or density of the radiation. That is, system sensing speed can be increased by increasing the flux level of the radiation which is to be attenuated as it passes through the medium for detection by the detector. Detectors or detector systems previously used in gauging applications, however, could not be used successfully with high radiation flux levels because of their limited dynamic range. For example, detector systems employing pulse counting circuitry are limited by the problem of pulse pileup, i.e., saturation of the electronic circuitry at high rates of detected scintillations. Consequently, this limited system sensing speed which in turn limited overall system speed such as the rate at which the sheet could be processed as in a sheet manufacturing and/or processing line.

Also known are detectors or detector systems which utilize current-to-frequency conversion circuitry. Such circuitry would operate to produce count signals at a frequency proportionally representative of the current output of a photomultiplier tube. Typically, this was accomplished by a current integrator which produced an electrical voltage output proportionally representative of the integral of the current output of the photomultiplier tube. When the integrator output reached a predetermined level indicating accumulation of a certain amount of charge in the feedback capacitor of the current integrator, a field effect transistor switch would be triggered to discharge the feedback capacitor, i.e., reset the capacitor to a ground or base line reference potential, and thereby generate a pulse count signal. One problem with such current-to-frequency conversion circuitry was that there was a certain amount of dead time when such circuitry was not responsive to the current output of the photomultiplier tube, such dead time being the time needed to discharge the capacitor to produce the pulse count signal. Consequently, there was a loss of stability at high current input rates as when the rate at which the feedback capacitor is being charged is on the order of the discharge rate of the feedback capacitor. Accordingly, such circuitry had limited dynamic range.

SUMMARY OF THE INVENTION

The present invention provides an improved system and method for sensing a parameter of a medium by means of radiation attenuation. Such improved system and method enables the usage of high flux level radiation to obtain high system sensing speeds.

Briefly, a system and method according to the invention is characterized by the use of a radiation detector having a high dynamic range obtained by the use of current-to-frequency conversion circuitry which uses a delta modulation technique to produce count signals at a frequency proportional to the current output of a scintillation probe at the front end of the detector.

More particularly, the invention provides a system and related method for sensing a parameter of a medium, the system including a radiation source for emitting radiation that will be attenuated as a function of such parameter upon passage through the medium and a radiation detector operatively positioned to detect such radiation that will be attenuated as aforesaid, and the system being further characterized by the detector comprising scintillator probe means for producing an electrical current output proportionally representative of detected radiation, current integrator means for continuously integrating the electrical current output of the scintillator probe means, such current integrator means having input means for receiving the electrical current output of the scintillator probe means and output means for producing an electrical output representative of the integral of current received at the input means, charge injector means for supplying to the input means of the current integrator means current pulses of predetermined total charge and of opposite polarity relative to the electrical current output of the scintillator probe means in response to the output of the current integrator means having a predetermined characteristic, and detector output means for generating count signals at a frequency proportionally representative of the frequency at which the current pulses are supplied to the input means of the current integrator means by the charge injector means.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a diagrammatic illustration of a sheet gauging system according to the invention;

FIG. 2 is a diagrammatic illustration of a radiation detector employed in the sheet gauging system of FIG. 1.

DETAILED DESCRIPTION

Figure 3:
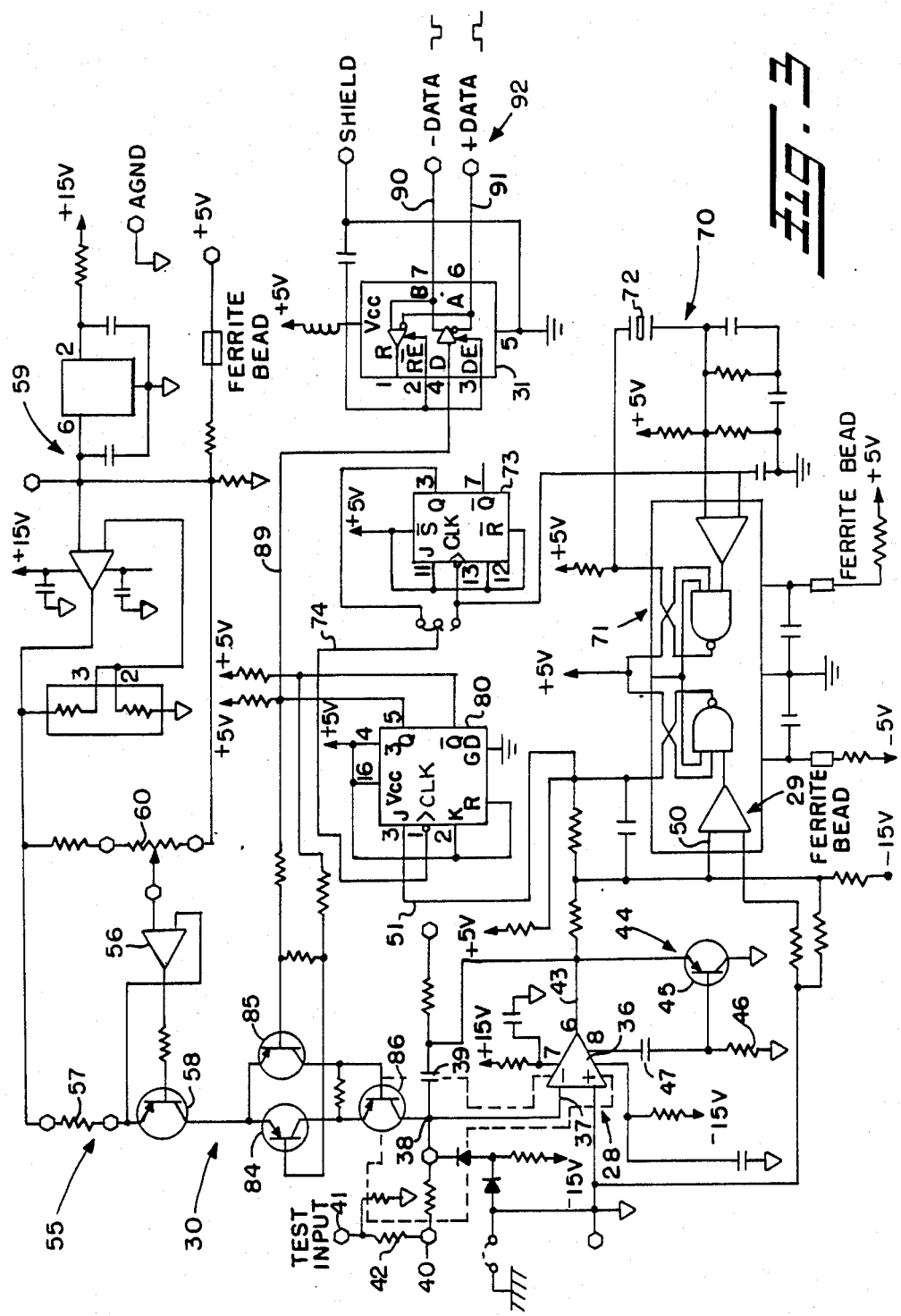
FIG. 3 is a circuit schematic of the electronics illustrated in FIG. 2.

Referring now in detail to the drawings and initially to FIG. 1, the basic components of a sheet gauging system, in accordance with the invention, can be seen to include a source 10 of radiation, a radiation detector 11 and a pulse count signal processor 12 which may be at a location remote from the detector. Although the invention will hereinafter be described with reference to such gauging system, one skilled in the art will readily appreciate that principles of the invention may be employed for purposes other than measuring the thickness of sheet material such as in other process control systems for measuring the density of a medium, measuring the moisture content of a medium, detecting the fill level of a medium, etc. The invention may also be employed in parts assembly systems such as for sensing the presence or absence of a part in an assembly.

As illustrated in FIG. 1, sheet material 16 to be gauged is passed between the radiation source 10 and the radiation detector 11 with the detector being located within the shadow of the sheet material. Accordingly, radiation emitted by the radiation source 10 will have to pass through the sheet material in order to be detected by the radiation detector. The radiation emitted by the source thereof may be of any suitable type that will be attenuated, i.e., partially absorbed by the sheet material, as a function of the thickness of the sheet material through which it passes.

As diagramatically illustrated in FIG. 2, the radiation detector 11 generally includes a scintillator probe 20 at its front end and supporting current-to-frequency conversion electronics 21. The scintillator probe 20 includes a scintillation element 22 optically coupled to a photoelectric transducer 23. The scintillation element 22 may be a scintillation crystal such as one sold under the trademark Polyscin by the Harshaw/Filtrol Partnership of Cleveland, Ohio, and the transducer 23 may be a photomultiplier tube of suitable type. As is well known, the scintillation crystal converts impinging invisible radiation to bursts of visible light which impinge on the photoemissive cathode of the photomultiplier tube. The electrons emitted by the action of the scintillation light produce negative going charge pulses at the anode of the photomultiplier tube to provide at output 24 of the photomultiplier tube a negative current (current going to the anode) proportional to the flux level of detected radiation. As is preferred, the scintillator probe 20 and supporting electronics 21 may be mounted in a compact housing.

The electronic circuitry 21, which uses a delta modulation technique, generally comprises a current integrator 28, a comparator 29, a charge injector 30 and a differential line driver 31 for transmitting pulse count signals generated in the hereinafter described manner at a frequency proportional to the current at output 24 of the photomultiplier tube 23. Accordingly, the detector will output count signals at a frequency proportional to the flux level of radiation detected at the front end of the detector which, as above indicated, will be a function of the thickness of the sheet material in the illustrated gauging system. Low voltage electric power may be provided to the circuitry 21 from a conventional power supply via filtered input regulators which are not shown.

With additional reference to the circuit schematic seen in FIG. 3, the current integrator 28 includes an operational amplifier 36, which has inverting input terminal 37 connected to a current summing junction 38, and a feed-back capacitor 39. The current summing junction 38 is connected via circuit input terminal 40 to the output 24 of the photomultiplier tube 23 and to the output of the charge injector 30. If desired, a test input 41 may be provided and also connected to terminal 40 by resistor 42 of high resistance value.

The voltage output of the operational amplifier 36 ramps positive in response to negative current at inverting input terminal 37, i.e., current going to the anode of the photomultiplier tube 23 (or a negative voltage at the test input 41) and negative in response to a positive current supplied by the charge injector 30 in the hereinafter described manner. The resulting voltage output of the operational amplifier 36 on line 43 will be proportional to the net charge received at the summing junction 38.

The operational amplifier 36 may have limited current sinking capacity in which case such amplifier may be provided with a dynamic buffer 44. The dynamic buffer 44 includes transistor 45 and resistor 46 which serve as a base drive starved emitter follower that provides emitter to collector current but at a level insufficient to override the output of the operational amplifier. Capacitor 47 couples the base drive of the operational amplifier 36 to the base of transistor 45 whereupon a negative operational amplifier swing, which turns off its NPN emitter-follower output stage, turns on transistor 45 to provide short duration high negative output current capacity. The duration of such high negative output current capacity is the product of the capacitance of capacitor 47 and the resistance of resistor 46.

The voltage output of the operational amplifier 36 on line 43 is fed to input 50 of the comparator 29. The comparator 29 compares the voltage at input 52 with a threshold voltage and when such threshold voltage is exceeded (thereby to indicate a predetermined characteristic of the voltage output of the operational amplifier), the comparator causes a logic true signal to be applied via line 51 to the charge injector 30 which, in response to such signal, supplies a positive current pulse of controlled total charge to the summing junction 38 in the below described manner. Such current pulse results in a short negative ramping step at the output of operational amplifier 36.

The charge injector 30 controls the injection current pulse by controlling both the current and time of such current pulse. The current is controlled by a constant current source 55 which includes an operational amplifier 56, a current sensing resistor 57 and a high current gain transistor 58. Due to the high current gain of transistor 58, the collector current is very nearly equal to the emitter current. The operational amplifier 56 forces the voltage across current sensing resistor 57 to be equal to the voltage supplied by regulated reference voltage circuitry 59 to the wiper voltage of potentiometer 60 which sets the emitter current of transistor 58.

The time or period of the injection current pulse is controlled by system clock 70. The system clock 70 includes an oscillator 71 controlled by a 5 MHz crystal 72, for example. The output signal of oscillator 71 is divided by jumpered connection of flip-flop 73 to provide a 2.5 MHz system clock signal on line 74. If desired, flip-flop 73 may be bypassed to provide a 5.0 MHz clock signal on line 74 although this may result in some loss of stability.

Line 74 is connected to the clock input of J-K flip-flop 80 which has its J input connected to output line 51 of the comparator 29. When the comparator output on line 51 becomes true (logic high) the next negative clock edge on line 74 causes flip-flop 80 to change state whereupon the Q and $\overline{Q}$ outputs of flip-flop 80 drive PNP transistors 84 and 85 to switch on a current pulse which is applied to the summing junction 38 via PNP common base switch 86. The transistors 84 and 85 serve as a differential switch providing a nearly constant load for the current source 55. The current pulse applied at the summing junction 38 will continue until the next clock edge at the clock input of flip-flop 80 resets flip-flop 80 to its original state thereby terminating the charge pulse. Accordingly, the time of the current pulse is one system clock period and, even at high input currents where the output of the comparator 29 may still or again be true after one clock period, the next negative clock edge will still reset flip-flop 80 to terminate the current pulse. For photomultiplier tube anode currents of 10.0 nanoamps to 1.25 milliamps, the charge per current pulse has an optimal range of 0.75 to 2.0 nanocoulombs but can be set, for example, as low as 0.20 nanocoulombs at some sacrifice of stability. The charge per pulse is determined by the system clock speed and the setting of potentiometer 60.

The Q output of flip-flop 80 also is sent via line 89 to the differential line driver 31 which preferably is an RS-422 balanced differential line driver which provides differential output pulses on respective lines 90 and 91 for each injection current pulse. Accordingly, the frequency at which the differential output pulses or count signals are provided will be equal the frequency at which the current pulses are produced by the charge injector 30. Since flip-flop 80 is reset to terminate each current pulse as above indicated, the maximum pulse rate at the detector output 92 is limited to one-half the speed of the system clock signal on line 74. The line driver transmits the frequency output of the detector to the processing unit 12 (including a receiver operated in balanced configuration with the driver) for conventional monitoring and/or overall system control purposes.

Summarizing, the output of operational amplifier 36 is proportional to the net charge received at the summing junction 38, and such output is compared to a predetermined threshold level by comparator 29. When the output voltage of operational amplifier 36 exceeds the comparator threshold, the charge injector 30 is caused to supply a current pulse of controlled total charge to the summing junction 38. As above noted, this results in a short negative ramping step at the output of operational amplifier 36. If the output of operational amplifier 36 continues to equal or exceed the threshold level, the charge injector will be caused to supply another current pulse of equal charge to the summing junction 38 and this will continue periodically until the output of operational amplifier 36 has been reduced to a level below the threshold level.

It is important to note that when a current pulse is being supplied to the summing junction 38 by the charge injector 30, the current output of the photomultiplier tube 23 will be summed with such current pulse for continuous processing of such current output by the current integrator 28 although then in summed combination with the injection current pulse. Accordingly, there is no dead time when the current output of the photomultiplier tube is not being processed. The result is circuitry having a high dynamic range, e.g., a 0.0 to 2.5 milliamp input current range with a scale factor that may be adjusted by potentiometer 60 (FIG. 3) from 500 Hz to 5 KHz per microamp, for example.

What is claimed is:

1. In a system for process monitoring by sensing a parameter of a medium, the system comprising:
    a radiation source for emitting radiation that will be attenuated as a function of such parameter upon passage through the medium;
    a radiation detector operatively positioned to detect such radiation that will be attenuated as aforesaid, said radiation detector including:
    scintillator probe means for producing an electrical current output proportionally representative of detected radiation;
    current integrator means for continuously integrating such electrical current output of said scintillator probe means, said integrator means having input means for receiving such electrical current output and output means for producing an electrical output representative of the integral of current received at said input means;
    current supply means for supplying to said input means current pulses of predetermined total charge and of opposite polarity relative to such electrical current output of said probe means in response to said integrator means electrical output having a predetermined characteristic; and
    output means for generating count signals at a frequency proportionally representative of the frequency at which such current pulses are supplied to said input means by said supply means; and
    pulse count signal processor means for receiving the count signals generated by said output means of said detector for providing an output representative of the sensed parameter for performance of a process monitoring function.

2. A system as set forth in claim 1, wherein said electrical current output of said probe means causes said integrator means electrical output to ramp positive and said current pulses cause said electrical output to ramp negative.

3. A system as set forth in claim 1, wherein said supply means includes comparator means for producing a comparator output signal in response to said integrator means electrical output having such predetermined characteristic, and charge injector means for generating current pulses of like total charge in response to said comparator output signal.

4. A system as set forth in claim 3, wherein said charge injector means includes current source means for supplying constant current, and means for electrically connecting said current source means to said input means of said integrator means for a period of controlled duration.

5. A system as set forth in claim 4, wherein said means for electrically connecting includes clock means producing clock pulses for controlling the duration of such period of controlled duration.

6. A system as set forth in claim 5, wherein said means for electrically connecting includes switch means operative in an on state to electrically connect said current source means to said input means of said integrator means and in an off state to electrically disconnect said current source means from said input means of said integrator means, and means responsive to said comparator output signal for turning said switch means on upon receipt of a first clock pulse from said clock means and then turning said switch means off upon receipt of a next clock pulse.

7. A system as set forth in claim 6, wherein said comparator means produces a logic true signal when said integrator means electrical output has such predetermined characteristic and a logic false signal when said integrator means electrical output does not have such predetermined characteristic, and said means for turning said switch means on and off operates to periodically turn said switch means on and off in response to clock pulses as long as said comparator means produces a logic true signal.

8. A system as set forth in claim 7, wherein said output means includes line driver means for transmitting a count signal in response to each turning on and off of said switch means.

9. A system as set forth in claim 1, wherein said current supply means includes means for supplying to said input means current pulses of predetermined total charge and of opposite polarity relative to such electrical current output of said probe means in response to said integrator means electrical output exceeding a threshold level.

10. A method of monitoring a process by sensing a parameter of a medium, comprising the steps of using a radiation source to emit radiation that will be attenuated as a function of such parameter upon passage through the medium, detecting such radiation that will be attenuated as aforesaid by using a scintillator probe to produce an electrical current output proportionally representative of the detected radiation, using a current integrator to continuously integrate the electrical current output of the scintillator probe, the integrator having an input for receiving the electrical current output of the scintillator probe and an output for producing an electrical output representative of the integral of current received at the input, using a current supply to supply to the input of the current integrator current pulses of predetermined total charge and of opposite polarity relative to the electrical current output of the probe in response to the integrator electrical output having a predetermined characteristic, outputting count signals at a frequency proportionally representative of the frequency at which the current pulses are supplied to the input by the current supply, and using the outputted count signals to provide an output representative of the sensed parameter for performing a process monitoring function.

* * * * *